United States Patent
Katou

(10) Patent No.: US 11,277,556 B2
(45) Date of Patent: Mar. 15, 2022

(54) CONTROL DEVICE FOR AUTOMATIC TRACKING CAMERA

(71) Applicant: JVCKENWOOD Corporation, Yokohama (JP)

(72) Inventor: Takakazu Katou, Yokohama (JP)

(73) Assignee: JVCKENWOOD Corporation, Yokohama (JP)

(*) Notice: Subject to any disclaimer, the term of this patent is extended or adjusted under 35 U.S.C. 154(b) by 0 days.

(21) Appl. No.: 16/836,989

(22) Filed: Apr. 1, 2020

(65) Prior Publication Data

US 2020/0314329 A1 Oct. 1, 2020

(30) Foreign Application Priority Data

Apr. 1, 2019 (JP) .............................. JP2019-070008
Apr. 1, 2019 (JP) .............................. JP2019-070009
Apr. 1, 2019 (JP) .............................. JP2019-070010

(51) Int. Cl.
*H04N 5/232* (2006.01)
*G06T 7/70* (2017.01)
*G06T 7/20* (2017.01)

(52) U.S. Cl.
CPC ........... *H04N 5/23218* (2018.08); *G06T 7/20* (2013.01); *G06T 7/70* (2017.01); *H04N 5/23299* (2018.08)

(58) Field of Classification Search
CPC .. H04N 5/23218; H04N 5/23299; G06T 7/70; G06T 7/20
USPC ......................................................... 348/169
See application file for complete search history.

(56) References Cited

U.S. PATENT DOCUMENTS

| | | | |
|---|---|---|---|
| 2014/0079290 A1* | 3/2014 | Nakano ..................... | G06T 7/20 382/107 |
| 2017/0161561 A1* | 6/2017 | Marty ................ | H04N 5/23238 |
| 2017/0163879 A1* | 6/2017 | Tsuji ..................... | G01S 3/7864 |
| 2018/0017659 A1 | 1/2018 | Irie | |
| 2018/0342077 A1* | 11/2018 | Tsuno .................. | G06K 9/6256 |
| 2019/0050994 A1* | 2/2019 | Fukagai ............... | G06K 9/3233 |
| 2019/0260943 A1* | 8/2019 | Strobert, Jr. ......... | F16M 11/041 |
| 2019/0303723 A1* | 10/2019 | Linden ...................... | G06T 7/20 |
| 2020/0053286 A1* | 2/2020 | Corona ............. | H04N 5/23267 |

FOREIGN PATENT DOCUMENTS

WO 2016/151925 9/2016

\* cited by examiner

*Primary Examiner* — Joseph G Ustaris
*Assistant Examiner* — Jimmy S Lee
(74) *Attorney, Agent, or Firm* — Amin, Turocy & Watson, LLP

(57) ABSTRACT

Based on information on a tracking target, a tracking target detecting unit is configured to detect the tracking target from an image captured by an automatic tracking camera. An influencing factor detecting unit is configured to detect an influencing factor that influences the amount of movement of the tracking target and set an influence degree, based on information on the influencing factor. Based on the influence degree set by the influencing factor detecting unit and a past movement amount of the tracking target, an adjustment amount calculating unit is configured to calculate an imaging direction adjustment amount for the automatic tracking camera.

13 Claims, 10 Drawing Sheets

| | INFLUENCE DEGREE | |
|---|---|---|
| INFLUENCING FACTOR | α | β |
| OPPONENT'S HOOP | 0.8 | 1 |

FIG.9

| INFLUENCING FACTOR | INFLUENCE DEGREE | |
|---|---|---|
| | α | β |
| FIRST PLAYER | 0.7 | 1 |
| SECOND PLAYER | 1.3 | 1 |

| INFLUENCING FACTOR | | INFLUENCE DEGREE | |
|---|---|---|---|
| | | $\alpha$ | $\beta$ |
| AREA | A | 0.8 | 1 |
| | B | 1 | 1 |
| | C | 0.8 | 1 |

CONTROL DEVICE FOR AUTOMATIC TRACKING CAMERA

CROSS-REFERENCE TO RELATED APPLICATIONS

This application claims priority from Japanese Applications No. 2019-070008, No. 2019-070009, and No. 2019-070010, filed on Apr. 1, 2019, the contents of which are incorporated by reference herein in its entirety.

BACKGROUND OF THE INVENTION

1. Field of the Invention

The present invention relates to a control device for an automatic tracking camera.

2. Description of the Related Art

A system that automatically tracks and captures an image of a tracking target that has been registered is known. Described in Patent Literature 1 (WO2016/151925) is a device that predicts, based on a movement history of a target, a position of the target after a predetermined time period, and calculates amounts of adjustment for panning and tilting of a camera such that the target after the predetermined time period is positioned at a predetermined position on an image capturing screen of the camera.

If the tracking target is in a state of moving at a constant velocity, the tracking target is able to be tracked accurately by the method described in Patent Literature 1. However, if the amount of movement of the tracking target changes, the panning and tilting operation of the camera may largely differ from the movement of the tracking target.

SUMMARY OF THE INVENTION

It is an object of the present invention to at least partially solve the problems in the conventional technology.

In the present embodiment, a control device for an automatic tracking camera that automatically tracks and images a tracking target is provided, the control device comprising: a tracking target detecting unit that is configured to detect, based on information on the tracking target, the tracking target from an image captured by the automatic tracking camera; an influencing factor detecting unit that is configured to detect an influencing factor that influences a movement amount of the tracking target and set an influence degree, based on information on the influencing factor; and an adjustment amount calculating unit that is configured to calculate an imaging direction adjustment amount for the automatic tracking camera, based on the influence degree set by the influencing factor detecting unit and a past movement amount of the tracking target.

Provided according to the present embodiment is an automatic tracking camera including: the above mentioned control device for the automatic tracking camera; an imaging unit; an imaging direction moving unit that moves, based on the imaging direction adjustment amount calculated by the adjustment amount calculating unit, imaging direction of the imaging unit; and a storage unit that stores therein information on the tracking target and information on the influencing factor.

Provided according to the present embodiment is a control method for an automatic tracking camera that automatically tracks and images a tracking target, the control method including: a tracking target detecting step of detecting, based on information on the tracking target, the tracking target from an image captured by the automatic tracking camera; an influencing factor detecting step of detecting an influencing factor that influences movement amount of the tracking target and sets an influence degree, based on information on the tracking target; and an adjustment amount calculating step of calculating, based on the set influence degree and a past movement amount of the tracking target, an imaging direction adjustment amount for the automatic tracking camera.

A control device for an automatic tracking camera, the automatic tracking camera, and a control method for the automatic tracking camera, according to the present embodiment enable a tracking target to be automatically tracked accurately even if the amount of movement of the tracking target changes.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a diagram illustrating a registered state of influencing factors in a second example;

DETAILED DESCRIPTION OF THE PREFERRED EMBODIMENTS

Described hereinafter by reference to the appended drawings are a control device for an automatic tracking camera, the automatic tracking camera, and a control method for the automatic tracking camera, according to embodiments.

First Embodiment

Figure 1:
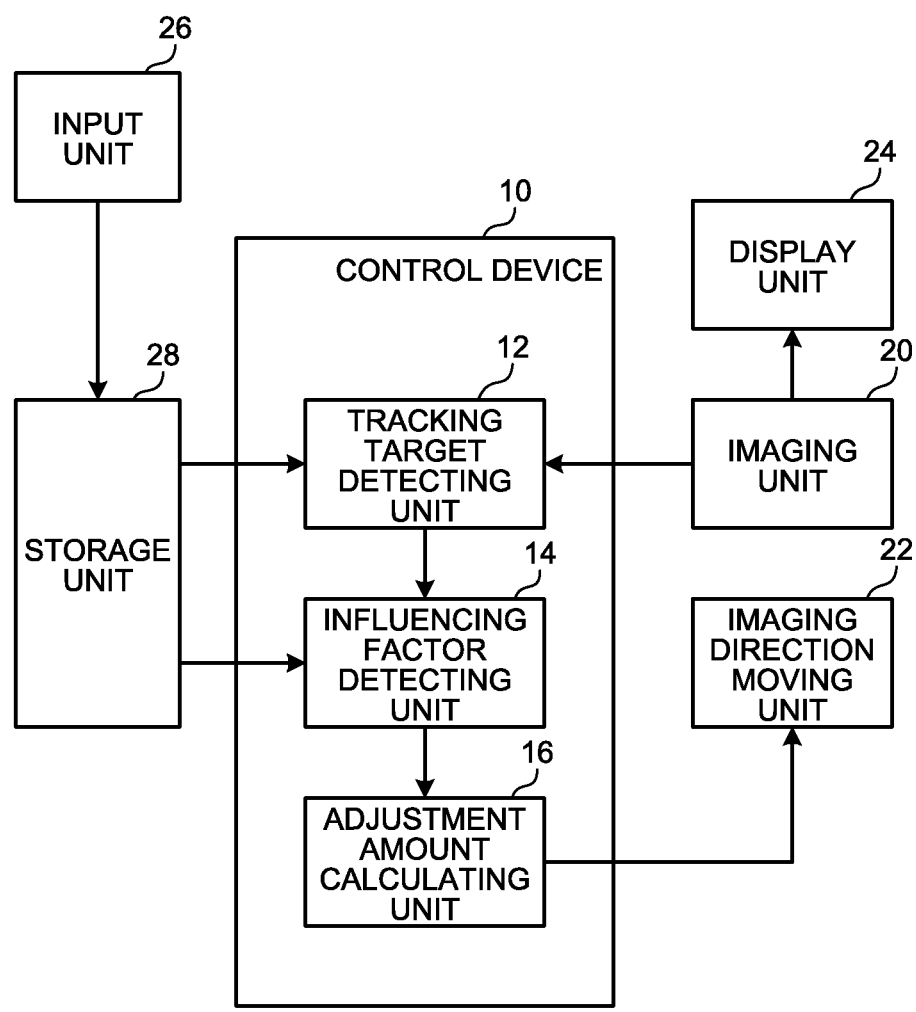
FIG. 1 is a block diagram illustrating an example of a configuration of an automatic tracking camera according to a first embodiment.

FIG. 1 is a block diagram illustrating an example of a configuration of an automatic tracking camera 100 according to a first embodiment. As illustrated in FIG. 1, the automatic tracking camera 100 includes a control device 10, an imaging unit 20, an imaging direction moving unit 22, a display unit 24, an input unit 26, and a storage unit 28.

The imaging unit 20 generates a video signal by imaging a subject and sends the generated video signal to the display unit 24 and the control device 10. The imaging direction moving unit 22 includes a mechanism (panning and tilting mechanisms) that moves imaging direction of the imaging unit 20, and the imaging direction moving unit 22 moves the imaging direction of the imaging unit 20, based on a control signal received from the control device 10. The display unit 24 is formed of a liquid crystal monitor and displays a video, based on the video signal received from the imaging unit 20. The input unit 26 receives input of information on a tracking target and an influencing factor and sends the received information to the storage unit 28.

The storage unit 28 stores therein the information on the tracking target and the information on the influencing factor, which have been input by the input unit 26. The storage unit 28 is formed of, for example, a random access memory (RAM).

The control device 10 includes a tracking target detecting unit 12, an influencing factor detecting unit 14, and an adjustment amount calculating unit 16. The tracking target detecting unit 12, the influencing factor detecting unit 14, and the adjustment amount calculating unit 16 may be formed of hardware or may be formed of software, and whether or not hardware and/or software are/is used therefor is arbitrary. In other words, the control device 10 can be a CPU which read the software from the storage unit 28, or the control unit 10 can be a circuit.

The tracking target detecting unit 12 detects, based on the information on the tracking target read from the storage unit 28, the tracking target from an image captured by the imaging unit 20. Based on the information on the influencing factor read from the storage unit 28, the influencing factor detecting unit 14 detects the influencing factor from the image captured by the imaging unit 20 and sets, based on a result of the detection of the influencing factor, an influence degree. The adjustment amount calculating unit 16 calculates a horizontal direction adjustment amount $Vx(n)$ and a vertical direction adjustment amount $Vy(n)$ that are adjustment amounts by which the imaging direction of the imaging unit 20 is moved by a method described later, and based on the calculated horizontal direction adjustment amount $Vx(n)$ and vertical direction adjustment amount $Vy(n)$, the adjustment amount calculating unit 16 controls the imaging direction moving unit 22. The horizontal direction adjustment amount $Vx(n)$ and the vertical direction adjustment amount $Vy(n)$ are also generally referred to as the imaging direction adjustment amount.

If the horizontal direction adjustment amount $Vx(n)$ is a positive value, the imaging direction moving unit 22 converts the $Vx(n)$ into a distance per unit time period Td on a screen of the display unit 24 and controls the panning mechanism such that the imaging direction is moved in a rightward direction by $Vx(n)$ which has been converted. If the horizontal direction adjustment amount $Vx(n)$ is a negative value, the imaging direction moving unit 22 converts the $Vx(n)$ into a distance per unit time period Td on a screen of the display unit 24 and controls the panning mechanism such that the imaging direction is moved in a leftward direction by $Vx(n)$ which has been converted.

If the vertical direction adjustment amount $Vy(n)$ is a positive value, the imaging direction moving unit 22 converts the $Vy(n)$ into a distance per unit time period Td on a screen of the display unit 24 and controls the tilting mechanism such that the imaging direction is moved in an upward direction by $Vy(n)$ which has been converted. If the vertical direction adjustment amount $Vy(n)$ is a negative value, the imaging direction moving unit 22 converts the $Vy(n)$ into a distance per unit time period Td on a screen of the display unit 24 and controls the tilting mechanism such that the imaging direction is moved in a downward direction by $Vy(n)$ which has been converted.

The unit time period Td may be arbitrarily set and is, for example, ten frame periods. The unit time period Td is not necessarily ten frame periods, but is preferably a time period corresponding to a multiple of a frame period.

Described hereinafter in detail is operation of the automatic tracking camera 100 based on specific examples.

First Example

Figure 2:
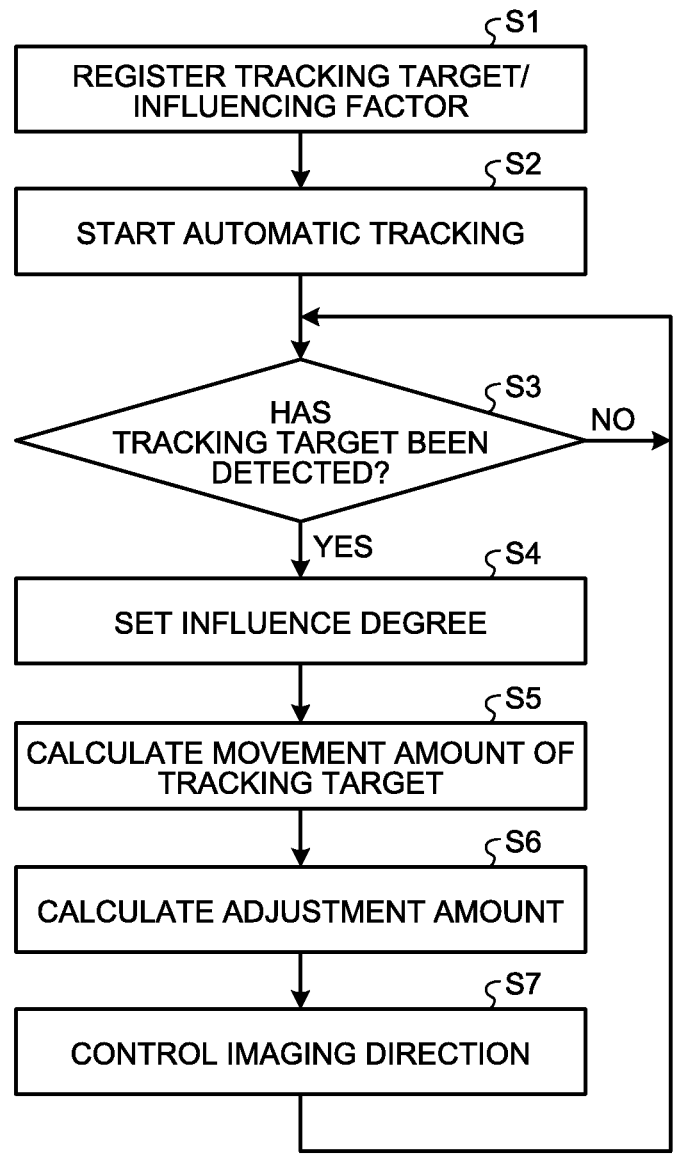
FIG. 2 is a flow chart for explanation of operation of the automatic tracking camera.

In this first example, description will be made on the assumption that a specific player is automatically tracked in a basketball game. FIG. 2 is a flow chart for explanation of operation of an automatic tracking camera. At Step S1 in FIG. 2, information on a tracking target and information on an influencing factor are registered.

The input unit 26 receives input of the tracking target. The tracking target may be input by a method where tracking target candidates are extracted for example by facial recognition from an image captured by the imaging unit 20 and a target desired to be tracked is selected from the extracted candidates. The information on the tracking target received by the input unit 26 is stored in the storage unit 28 and registration of the tracking target is then completed. A target point to be tracked may be arbitrarily set. For example, the center of the face of a person registered as the tracking target may be set as the target point to be tracked, or the center of the body of the person registered as the tracking target may be set as the target point.

Similarly, the input unit 26 receives input of the influencing factor. The influencing factor is a factor assumed to influence the amount of movement of the tracking target. Similarly to the input of the tracking target, the input of the influencing factor may be performed based on a captured image. Furthermore, when the influencing factor is input, input of an influence degree is also received for each influencing factor. The information on the influencing factor received by the input unit 26 is stored in the storage unit 28 and registration of the influencing factor is then completed.

Figure 3:
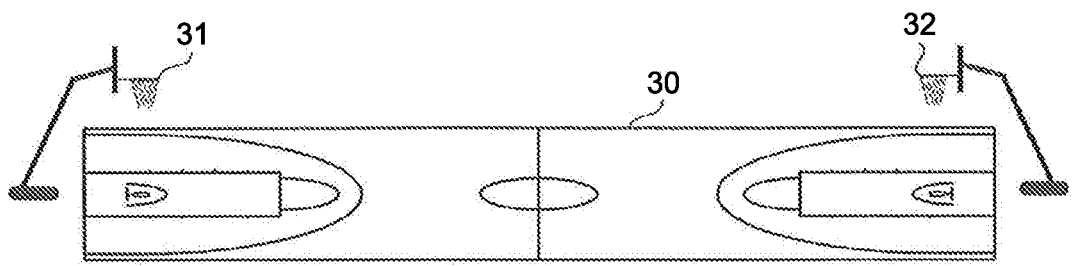
FIG. 3 is a diagram illustrating a basketball court and hoops.

FIG. 3 is a diagram illustrating a basketball court 30 and hoops. In FIG. 3, the hoop on the left is a player's hoop 31 and the hoop on the right is an opponent's hoop 32. In this first example, an image near the opponent's hoop 32 is registered as an influencing factor.

Figures 4, 5:
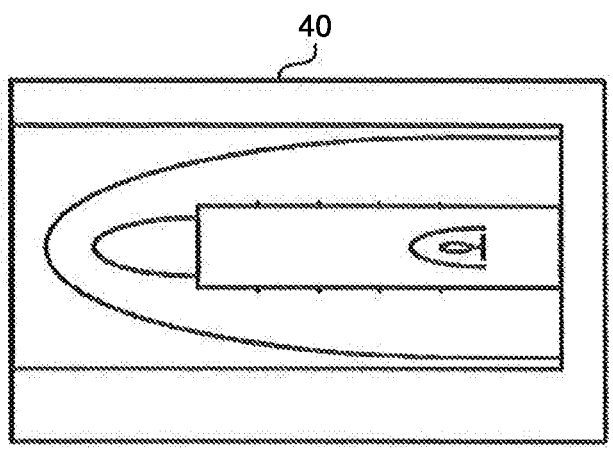
FIG. 4 is a diagram illustrating a registered image of an influencing factor in a first example.
FIG. 5 is a diagram illustrating a registered state of the influencing factor in the first example.

FIG. 4 illustrates an image 40 near the opponent's hoop 32, the image 40 having been input as the influencing factor. Subsequently, degrees of influence corresponding to the input influencing factor are input. Here, a horizontal direction influence degree $\alpha$ is input as "0.8" and a vertical direction influence degree $\beta$ is input as "1". Information on the influencing factor is stored in the storage unit 28. FIG. 5 illustrates a registered state of the influencing factor.

As illustrated in FIG. 2, automatic tracking is started at Step S2. At Step S3, the tracking target detecting unit 12 reads the information on the tracking target from the storage unit 28, and performs operation of detecting the tracking target from the image captured by the imaging unit 20. If the tracking target has not been detected (S3/no), Step S3 is repeated until the tracking target has been detected. If the tracking target has been detected (S3/yes), the operation proceeds to Step S4.

At Step S4, the influencing factor detecting unit 14 sets degrees of influence. Firstly, the influencing factor detecting unit 14 reads the information on the influencing factor from the storage unit 28 and performs operation of detecting the influencing factor from the image captured by the imaging unit 20. The influencing factor is detected by a method where a similarity between the registered image 40 of the influencing factor and the image captured is evaluated and the influencing factor is determined to have been detected if this similarity is, for example, equal to or greater than 30%.

If the influencing factor has been detected, the influencing factor detecting unit 14 reads values of the horizontal direction influence degree α and the vertical direction influence degree β both corresponding to the detected influencing factor and sets the read values as degrees of influence. If the influencing factor has not been detected, the horizontal direction influence degree α and the vertical direction influence degree β are both set to "1".

At Step S5, the adjustment amount calculating unit 16 calculates a movement amount of the tracking target in an immediately previous unit time period Td. Firstly, the adjustment amount calculating unit 16 compares an image of the latest frame with an image of a frame previous to the latest frame by the unit time period Td, and calculates an in-image movement amount of the tracking target.

Figure 6:
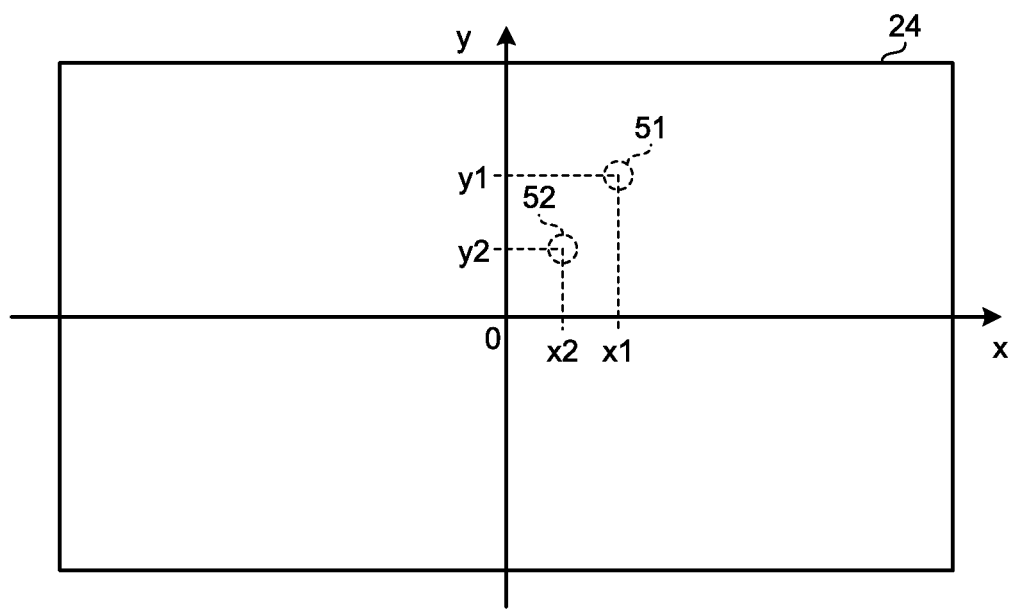
FIG. 6 is a diagram illustrating how position of a tracking target moves in an image.

FIG. 6 illustrates an example of an image displayed by the display unit 24. For explanation, the horizontal direction in the image will be referred to as an x-direction, the vertical direction therein will be referred to as a y-direction, and the center coordinates of the image will be written as (x, y)=(0, 0). Furthermore, the control device 10 controls the imaging direction moving unit 22 such that a tracking target comes to the center of an image.

When a tracking target is detected at a position 51 having coordinates (x1, y1), the control device 10 controls the horizontal direction adjustment amount Vx(n−1) to be x1 and the vertical direction adjustment amount Vy(n−1) to be y1, such that the tracking target comes to the center of the image. Here, a case is considered that imaging direction of the imaging unit 20 has been moved by the imaging direction moving unit 22 and the tracking target has been positioned at a position 52 having coordinates (x2, y2) in an image captured after the unit time period Td. In this case, a horizontal direction movement amount Mx(n−1) of the tracking target in the immediately previous unit time period Td is thus calculated to be "x1+x2". Similarly, a vertical direction movement amount My(n−1) of the tracking target in the immediately previous unit time period Td is calculated to be "y1+y2".

If the tracking target is moving at a constant velocity, for the tracking target to come to the center of the image, the horizontal direction adjustment amount for the imaging unit 20 may be controlled to be an amount resulting from addition between: the movement amount of the tracking target in the immediately previous unit time period Td; and an amount of deviation of the tracking target from the center of the image. According to this embodiment, an imaging direction adjustment amount is calculated on the assumption that the movement amount of the tracking target changes according to the influencing factor.

As illustrated in FIG. 2, at Step S6, the adjustment amount calculating unit 16 calculates a horizontal direction adjustment amount Vx(n) by Equation 1. Similarly, the adjustment amount calculating unit 16 calculates a vertical direction adjustment amount Vy(n) by Equation 2.

$$Vx(n)=\alpha \times Mx(n-1)+x2 \qquad (1)$$

$$Vy(n)=\beta \times My(n-1)+y2 \qquad (2)$$

That is, based on the influence degrees set by the influencing factor detecting unit 14 and the past movement amount of the tracking target, the adjustment amount calculating unit 16 calculates the imaging direction adjustment amount for the automatic tracking camera.

At Step S7, based on the calculated horizontal direction adjustment amount Vx(n) and vertical direction adjustment amount Vy(n), the adjustment amount calculating unit 16 controls the imaging direction moving unit 22. The imaging direction moving unit 22 moves, based on the horizontal direction adjustment amount Vx(n), the imaging direction of the imaging unit 20 in the horizontal direction, and, based on the vertical direction adjustment amount Vy(n), the imaging direction of the imaging unit 20 in the vertical direction. By repeating the operation from Step S2 to Step S6, the automatic tracking camera 100 automatically tracks and images the tracking target.

Figure 7:
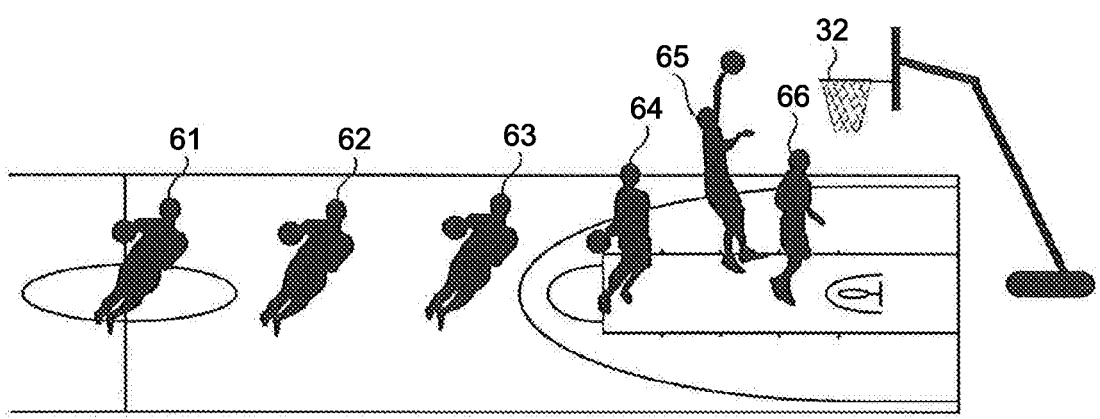
FIG. 7 is a diagram for explanation of movement of the tracking target in a basketball game.

FIG. 7 is an example where examples of movement of a tracking target in a basketball game have been displayed successively. The tracking target heading for the opponent's hoop 32 while dribbling the ball continues dribbling from a position 61 to a position 63, gets into shooting posture at a position 64, hits a jump shot at a position 65, and lands on the floor at a position 66.

In this movement, the horizontal direction velocity of the tracking target is nearly constant from the position 61 to the position 63 and decreases from the position 64 near the opponent's hoop. A case is assumed where the tracking target is automatically tracked from the position 61 to the position 66. The automatic tracking camera 100 is assumed to have started tracking of the tracking target before the position 61.

Figure 8A:
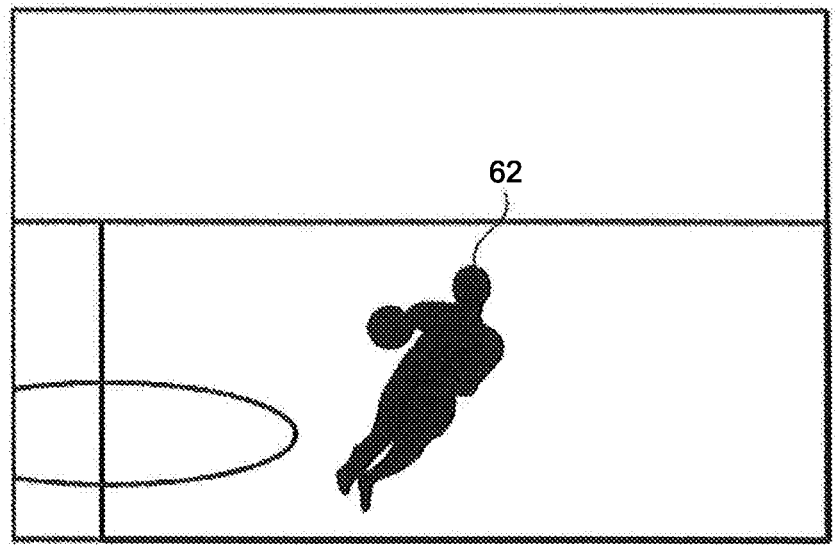
FIGS. 8A and 8B are examples of images captured by an automatic tracking camera.

FIG. 8A illustrates an example of an image captured by the automatic tracking camera 100 when the tracking target is at the position 62. The image in FIG. 8A does not include an image near the opponent's hoop that is an influencing factor, and thus the horizontal direction influence degree α and the vertical direction influence degree β are both "1". Therefore, the amount of adjustment of the imaging direction becomes a value corresponding to a moving distance of the tracking target in the immediately previous unit time period Td and the moving tracking target moving at a substantially constant velocity is thus able to be tracked.

Figure 8B:
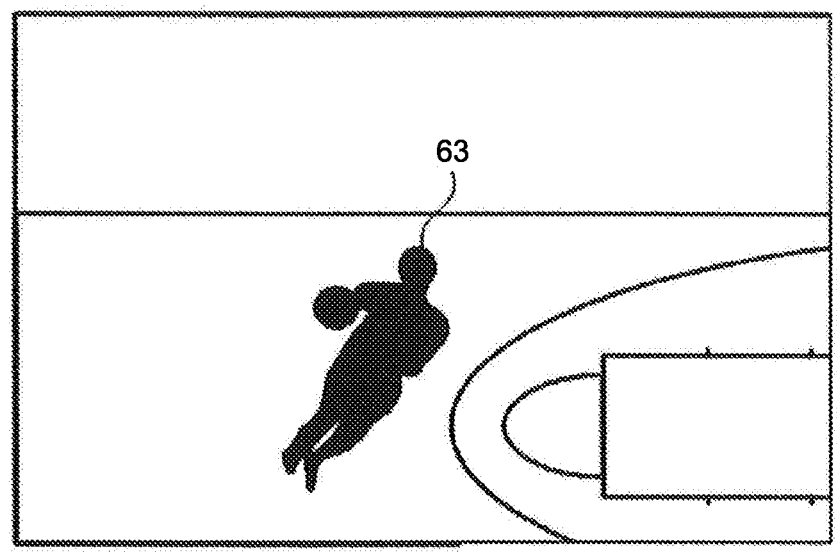

FIG. 8B illustrates an example of an image captured by the automatic tracking camera 100 when the tracking target is at the position 63. Since the image in FIG. 8B includes an image near the opponent's hoop that is an influencing factor, the horizontal direction influence degree α is 0.8 and the vertical direction influence degree β is 1. Therefore, the lateral direction adjustment amount for the imaging direction becomes smaller than the value corresponding to the moving distance of the tracking target in the immediately preceding unit time period Td and the tracking target that decreases in the horizontal direction moving velocity is thus able to be tracked accurately.

Examples of a case where a fixed object is registered as an influencing factor include various examples, in addition to an example where an image near a goal in a sport game is registered as described above. For example, if the automatic tracking camera 100 according to the first embodiment is used as a monitoring camera installed in a city, an image of a building or an image of a pedestrian crossing may be registered as an influencing factor.

Second Example

In the first example, the image near the hoop is registered as the influencing factor, but the influencing factor is not limited to a fixed object and may be a moving object. For example, a player in an opponent team may be registered as an influencing factor. The influencing factor may be registered by a method similar to the method of registering the tracking target described with respect to the first example, but when a player in an opponent team is registered as an influencing factor, the shape or color of the player's uniform may be registered without registration by facial recognition.

If a moving object is registered as an influencing factor, different influence degrees may be registered depending on the positional relation between the tracking target and the influencing factor. For example, if a player or players of an opponent team is/are registered as an influencing factor or influencing factors, a player of the opponent team detected in the moving direction of the tracking target is registered as a first player and a player of the opponent team detected in the direction opposite to the moving direction of the tracking target is registered as a second player. Values of influence degrees of the first player and second player are different from each other. For example, the first player's horizontal direction influence degree $\alpha$ is registered as "0.7" and the second player's horizontal direction influence degree $\alpha$ is registered as "1.3". Their vertical direction influence degrees $\beta$ are both registered as "1". FIG. 9 illustrates a registered state of the influencing factors in this second example.

A flow of automatic tracking in this second example is basically similar to that in the first example described by use of FIG. 2, but operation at Step S4 in the second example is partially different from that in the first example. In the second example, at Step S4, the influencing factor detecting unit 14 detects a target that has been registered as an influencing factor as different influencing factors when the target is detected in the moving direction of the tracking target and when the target is detected in the direction opposite to the moving direction.

That is, when a target that has been registered as an influencing factor is detected in the moving direction of the tracking target, the influencing factor detecting unit 14 detects the influencing factor as the first player and sets the horizontal direction influence degree $\alpha$ as "0.7" and the vertical direction influence degree $\beta$ as "1". As a result, the horizontal direction adjustment amount Vx(n) generated by the adjustment amount calculating unit 16 becomes small and the horizontal direction movement amount of the imaging unit 20 becomes small.

Furthermore, when the target that has been registered as the influencing factor is detected in a direction opposite to the moving direction of the tracking target, the influencing factor detecting unit 14 detects the influencing factor as the second player and sets the horizontal direction influence degree $\alpha$ as "1.3" and the vertical direction influence degree $\beta$ as "1". As a result, the horizontal direction adjustment amount Vx(n) generated by the adjustment amount calculating unit 16 becomes large and the horizontal direction movement amount of the imaging unit 20 becomes large.

If a player of the opponent team has approached the tracking target from the moving direction of the tracking target, the tracking target is expected to decrease in velocity. Furthermore, if a player of the opponent team has approached the tracking target from a direction opposite to the moving direction, the tracking target is expected to increase in velocity. The automatic tracking camera 100 detects an influencing factor that influences the amount of movement of a tracking target, calculates, based on a positional relation between the influencing factor and the tracking target, an imaging direction adjustment amount for the imaging unit 20, and thus is able to track the tracking target accurately even if the amount of movement of the tracking target changes.

Examples of a case where a moving object is registered as an influencing factor include various examples, in addition to an example where an image of a player of an opponent team in a sport game is registered as described above. For example, if the automatic tracking camera 100 according to the first embodiment is used as a monitoring camera installed in a city, an image of a person or an automobile other than a tracking target may be registered as an influencing factor and the degree of influence may be changed based on a positional relation between the tracking target and the influencing factor.

The first example is an example where a fixed object is registered as an influencing factor and the second example is an example where a moving body is registered as an influencing factor, but plural influencing factors may be registered together and both a fixed object and a moving object may be registered as influencing factors together. If the influencing factor detecting unit 14 has detected plural influencing factors, the influencing factor detecting unit 14 may set a final influence degree that is a value calculated based on influence degrees registered correspondingly to the plural influencing factors. For example, if m (where m is an integer equal to or greater than 2) influencing factors have been detected, horizontal direction influence degrees respectively corresponding to the detected influencing factors are $\alpha 1, \alpha 2, \ldots, \alpha m$, and vertical direction influence degrees corresponding thereto are $\beta 1, \beta 2, \ldots, \beta m$; the final horizontal direction influence degree $\alpha$ and the final vertical direction influence degree $\beta$ are calculated by Equation 3 and Equation 4.

$$\alpha = \alpha 1 \times \alpha 2 \times \ldots \times \alpha m \quad (3)$$

$$\beta = \beta 1 \times \beta 2 \times \ldots \times \beta m \quad (4)$$

The method of calculating the final influence degree in the case where plural influencing factors have been detected is not limited to the above described method. For example, an average value of the influence degrees may be calculated as the final influence degree.

The automatic tracking camera 100 according to the first embodiment enables accurate tracking of a tracking target even in a case where the amount of movement of the tracking target changes, because an influencing factor that influences the amount of movement of the tracking target is detected, an influence degree of the detected influencing factor is set, and the imaging direction adjustment amount for the imaging unit 20 is changed based on the set influence degree and a past movement amount.

Second Embodiment

Described next is a second embodiment. According to the first embodiment, an influencing factor is registered as an image and the influencing factor is detected from a captured image, but according to the second embodiment, the imaging direction of an imaging unit 20 according to the second embodiment is registered as an influencing factor. Mainly described hereinafter are parts different from those according to the first embodiment. The same reference signs will be assigned to configurations that are similar to those according to the first embodiment and description thereof may be omitted.

Figure 10:
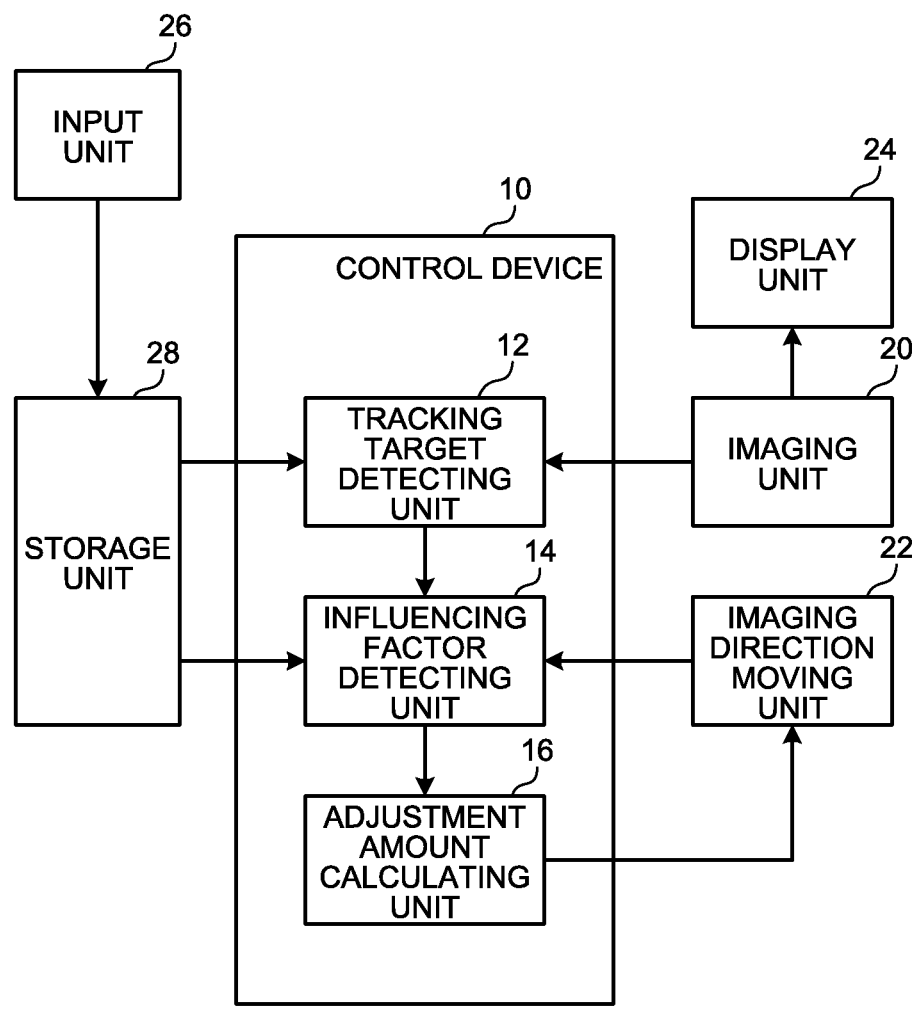
FIG. 10 is a block diagram illustrating an example of a configuration of an automatic tracking camera according to a second embodiment.

FIG. 10 is a block diagram illustrating an example of a configuration of an automatic tracking camera 200 according to the second embodiment. The automatic tracking camera 200 according to the second embodiment is different from the automatic tracking camera 100 according to the first embodiment in that a signal indicating the imaging direction of the imaging unit 20 is sent to an influencing factor detecting unit 14 according to the second embodiment from an imaging direction moving unit 22 according to the second embodiment.

Operation of the automatic tracking camera 200 will be described by use of FIG. 2. At Step S1, information on a tracking target and influencing factors is registered. The tracking target is registered by a method that is the same as that according to the first embodiment, and the influencing factors are registered correspondingly to the imaging direction of the imaging unit 20 according to the second embodiment.

Figures 11, 12:
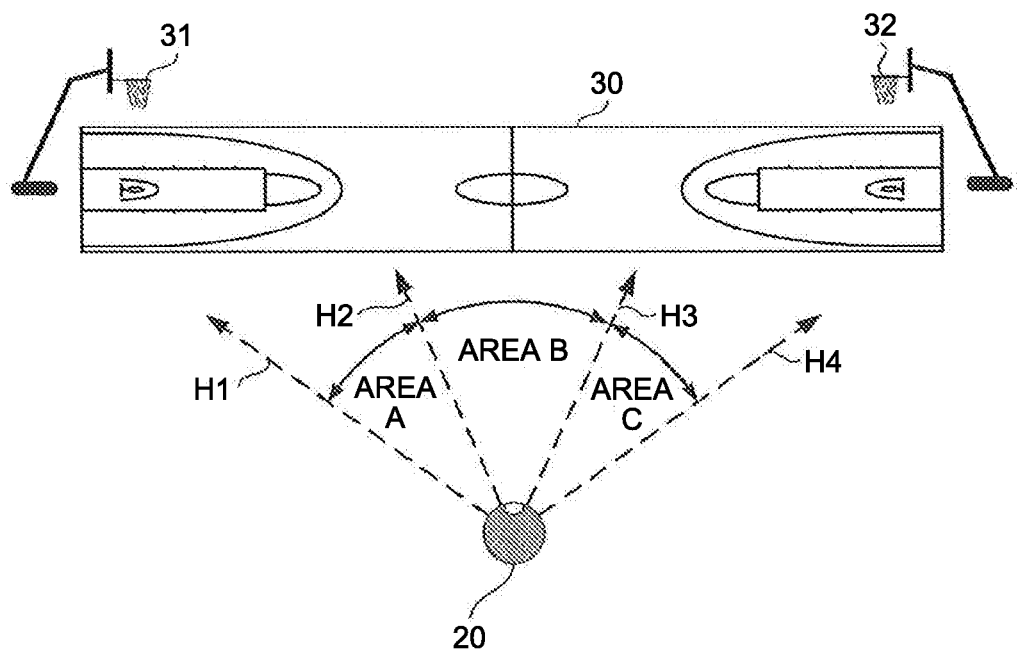
FIG. 11 is a diagram illustrating how an imaging unit captures an image of a basketball court.
FIG. 12 is a diagram illustrating a registered state of influencing factors according to the second embodiment.

FIG. 11 illustrates how the imaging unit 20 captures an image of the basketball court 30. Broken-lined arrows H1 to H4 in FIG. 11 indicate imaging directions of the imaging unit 20. The imaging unit 20 is able to move its imaging direction at least from H1 to H4. Plural areas are set correspondingly to the imaging directions of the imaging unit 20 and influence degrees are registered correspondingly to the set areas respectively. For example, influence degrees are registered correspondingly to an area A between the imaging directions H1 and H2, an area B between the imaging directions H2 and H3, and an area C between the imaging directions H3 and H4, respectively.

For example, a horizontal direction influence degree α of each of the areas A and C is registered as "0.8", and a horizontal direction influence degree α of the area B is registered as "1". Vertical direction influence degrees are all registered as "1" for all of the areas. FIG. 12 illustrates a registered state of the influencing factors.

Description will now be made by reference to FIG. 2 again. The operation from Step S2 to Step S3 is similar to that according to the first embodiment. At Step S4, from information on an imaging direction received from the imaging direction moving unit 22, the influencing factor detecting unit 14 detects in which area the imaging direction is in, reads values of the horizontal direction influence degree α and vertical direction influence degree β corresponding to the detected area from the storage unit 28, and sets the read values as influence degrees. The operation from Step S5 is similar to that according to the first embodiment.

The automatic tracking camera 200 according to the second embodiment is controlled such that the horizontal direction adjustment amount Vx(n) for the imaging unit 20 is decreased as the imaging direction of the imaging unit 20 becomes closer to a hoop. Accordingly, a tracking target that decreases in horizontal direction moving velocity near a hoop is thereby able to be tracked accurately.

The automatic tracking camera 200 according to the second embodiment is able to track a tracking target accurately even if the amount of movement of the tracking target changes according to the position of the tracking target, because an influence degree is set based on correspondence information between imaging directions and influence degrees and an imaging direction adjustment amount for the imaging unit 20 is calculated based on the set influence degree and a past movement amount of the tracking target.

A configuration including a combination of the first embodiment and second embodiment may be adopted also. If plural influencing factors have been detected, final influence degrees may be calculated by Equation 3 and Equation 4 described with respect to the first embodiment.

For simplification of explanation, according to the first and second embodiments, the vertical direction influence degrees β of the imaging unit 20 are all set to "1", but the vertical direction influence degrees β may be set arbitrarily similarly to the horizontal direction influence degrees α.

Third Embodiment

According to a third embodiment, based on plural factors that influence the amount of movement of a tracking target, an influence degree is set by use of artificial intelligence (AI). Mainly described hereinafter are parts different from those according to the first or second embodiment. The same reference signs will be assigned to configurations that are similar to those according to the first or second embodiment and description thereof may be omitted.

Figure 13:
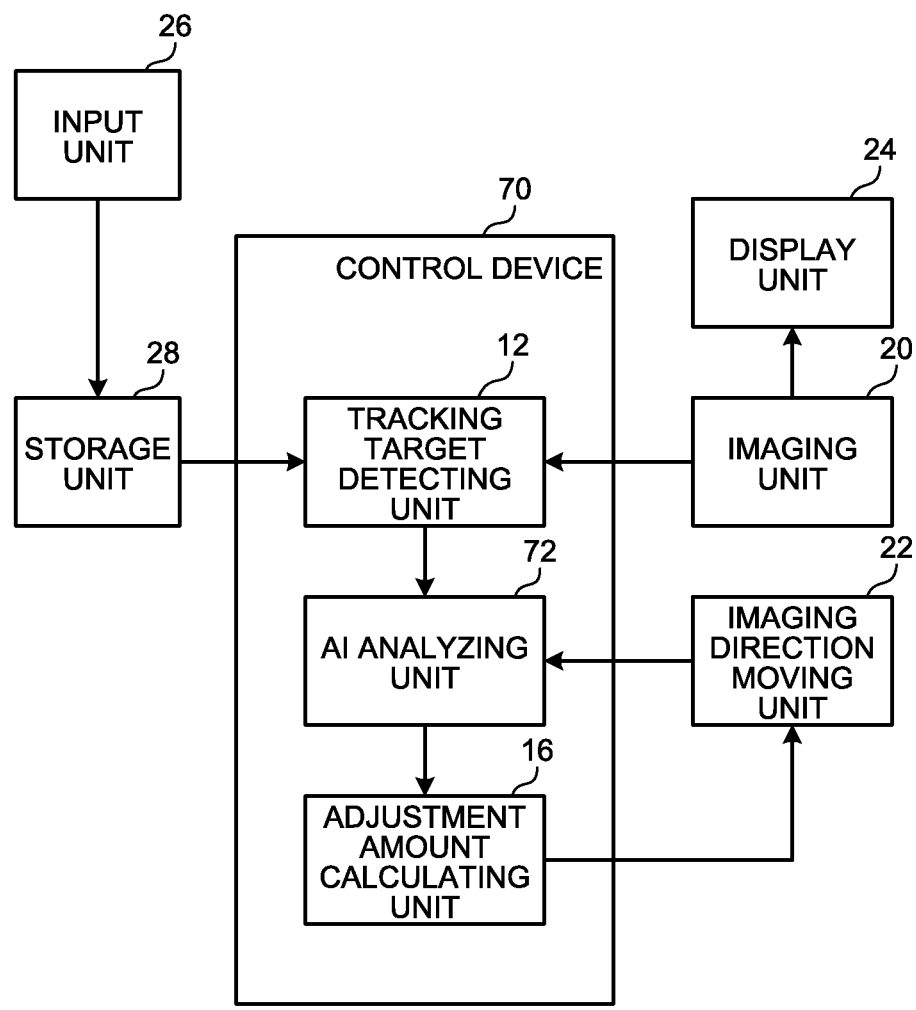
FIG. 13 is a block diagram illustrating an example of a configuration of an automatic tracking camera according to a third embodiment.

FIG. 13 is a block diagram illustrating an example of a configuration of an automatic tracking camera 300 according to the third embodiment. As illustrated in FIG. 13, the automatic tracking camera 300 includes a control device 70, an imaging unit 20, an imaging direction moving unit 22, a display unit 24, an input unit 26, and a storage unit 28.

The control device 70 includes a tracking target detecting unit 12, an adjustment amount calculating unit 16, and an AI analyzing unit 72. The tracking target detecting unit 12, the adjustment amount calculating unit 16, and the AI analyzing unit 72 may be formed of hardware or may be formed of software, and whether or not hardware and/or software are/is used therefor is arbitrary. The storage unit 28 is configured by use of, for example, a random access memory (RAM) and stores therein information on a tracking target.

Based on influencing factors that influence the amount of movement of the tracking target, the influencing factors being input from plural sensors not illustrated in the drawings, the AI analyzing unit 72 sets a horizontal direction influence degree α and a vertical direction influence degree β. Based on the influence degrees set by the AI analyzing unit 72 and a past movement amount of the tracking target, the adjustment amount calculating unit 16 calculates imaging direction adjustment amounts for the automatic tracking camera 300 by Equation 1 and Equation 2. Based on the calculated imaging direction adjustment amounts, the adjustment amount calculating unit 16 controls the imaging direction moving unit 22. Furthermore, the AI analyzing unit 72 performs deep learning with tracking results that are images captured by controlling the imaging direction of the imaging unit 20 based on the set influence degrees.

Figure 14:
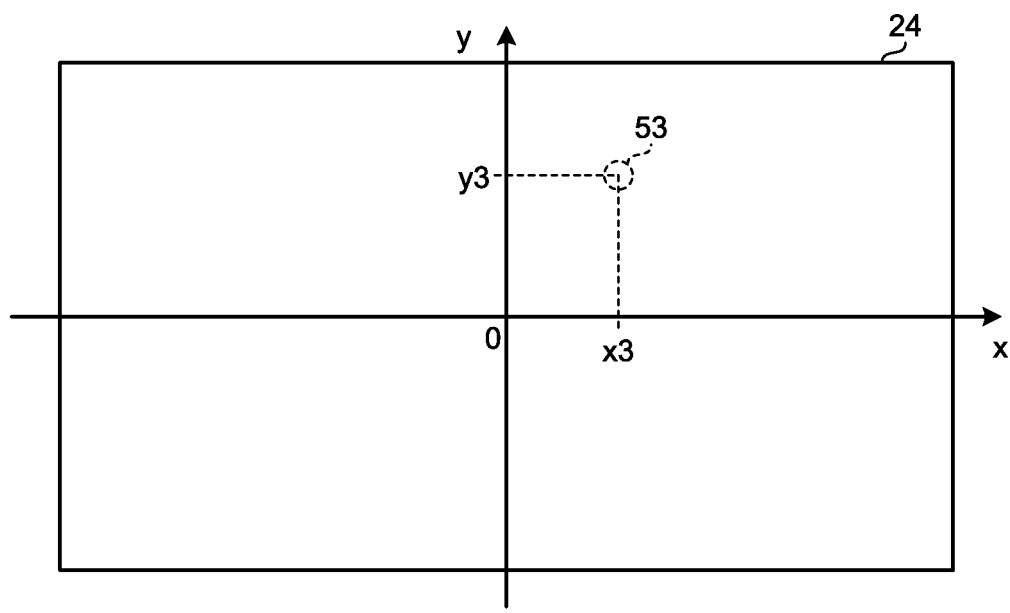
FIG. 14 is a diagram for explanation of a specific example of deep learning.

A specific example of the deep learning will be described below by use of FIG. 14. FIG. 14 illustrates an image captured by controlling the imaging direction of the imaging unit 20 through use of the horizontal direction influence degree α and the vertical direction influence degree β set by the AI analyzing unit 72. For explanation, the horizontal direction in the image will be referred to as the x-direction, the vertical direction therein will be referred to as the y-direction, and the center coordinates of the image will be written as "(x, y)=(0, 0)".

As illustrated in FIG. 14, a center 53 of a tracking target in the captured image is assumed to be deviated from the center (x, y)=(0, 0) of an imaging range by x3 in the horizontal direction and y3 in the vertical direction. If influence degrees calculated such that the center of the tracking target is centered in the imaging range are correct influence degrees, the correct influence degrees α' and β' are calculated as expressed by Equation 5 and Equation 6 from Equation 1 and Equation 2.

$$\alpha' = \alpha + x3/(Vx(n)+x3) \quad (5)$$

$$\beta' = \beta + y3/(Vy(n)+y3) \quad (6)$$

As described above, based on the captured image, the correct influence degrees α' and β' are able to be calculated. Furthermore, the AI analyzing unit 72 is able to be caused to perform deep learning with teacher data that are a set of the correct influence degrees α' and β' calculated and the influencing factors that have been input.

That is, the AI analyzing unit 72 calculates correct answers for influence degrees by analyzing an image captured by the automatic tracking camera 300 having its imaging direction moved based on an imaging direction adjustment amount calculated by the adjustment amount calculating unit 16, and executes deep learning by using, as teacher data, the calculated correct answers for the influence degrees and plural factors that influence the amount of movement of the tracking target.

The AI analyzing unit 72 may use a pre-trained AI model, but when using the pre-trained Ai model, an AI model that has been subjected to deep learning with games under similar conditions is preferably used. Specifically, an AI model that has been subjected to deep learning with games under similar conditions on the player age group, sex, and level (whether the level is at the professional level or the amateur level) is used. More preferably, the AI analyzing unit 72 may generate an AI model specific to a tracking target by subjecting the pre-trained AI model to deep learning with tracking states of the tracking target in the game.

The plural factors that influence the amount of movement of the tracking target and are input to the AI analyzing unit 72 preferably include, in addition to an influencing factor registered as an image as described with respect to the first embodiment, and information on the imaging direction of the imaging unit 20 as described with respect to the second embodiment, at least one selected from a group including: an elapsed time period from the start of the game; time; score information on points and the number of fouls; temperature; humidity; and moving velocity of the tracking target.

An image having a tracking target captured therein may be analyzed, the degree of fatigue of the tracking target may be expressed as a numerical value, and the numerical value may be input as an influencing factor. Furthermore, vital data, such as a tracking target's heart rate, may be input as an influencing factor. Examples of a method of acquiring vital data on a tracking target include: a method where a sensor having a communication function is attached to the tracking target and the control device 70 receives the vital data by wireless communication; and a method where an image having the tracking target captured therein is analyzed and converted into a numerical value.

Operation of the automatic tracking camera 300 will be described by use of FIG. 2. At Step S1, a tracking target is registered. The tracking target is registered by a method similar to that according to the first embodiment. The operation from Step S2 to Step S3 is similar to that according to the first embodiment.

At Step S4, based on plural factors that influence the amount of movement of the tracking target, the AI analyzing unit 72 sets a horizontal direction influence degree α and a vertical direction influence degree β. The operation from Step S5 is similar to that according to the first or second embodiment.

The automatic tracking camera 300 according to the third embodiment is able to track a tracking target accurately even if the amount of movement of the tracking target changes, because degrees of influence on the amount of movement of the tracking target are set by use of artificial intelligence based on plural factors that influence the amount of movement of the tracking target and imaging direction adjustment amounts for the imaging unit 20 are calculated based on the set influence degrees and a past movement amount.

With respect to the first to third embodiments, an example where control is performed such that a tracking target comes to the center of a captured image has been described, but without being limited to this example, control may be performed such that the tracking target comes to a position other than the center of the imaging range. For example, if a tracking target is displaced from the center of the imaging area at a certain time point, the control device 10 or the control device 70 aims to capture an image such that displacement between the tracking target and the center of the imaging range is reduced, instead of aiming to capture an image such that the tracking target comes to the center of the imaging range after a unit time period Td.

Figure 15:
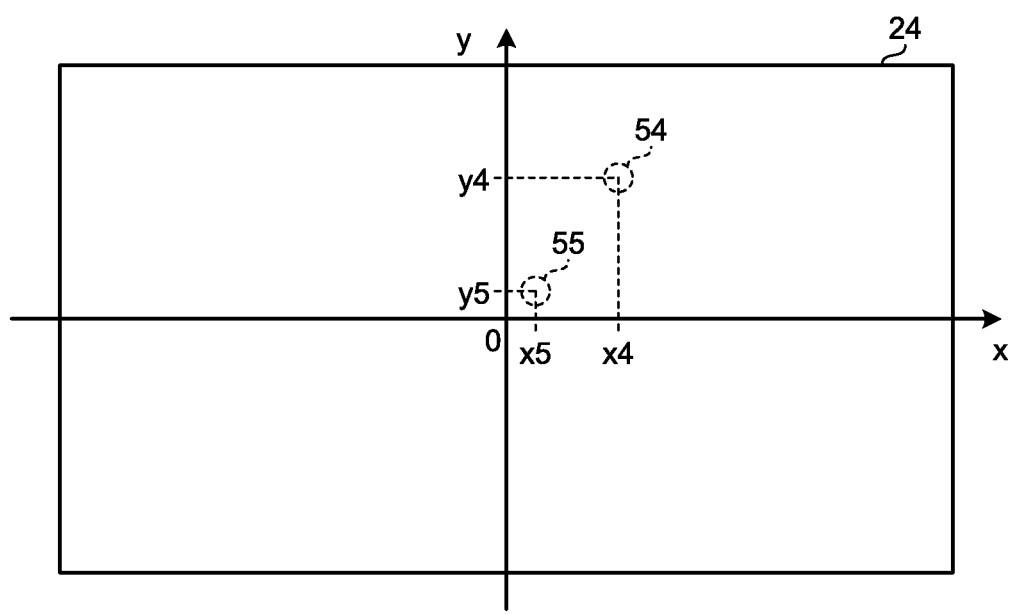
FIG. 15 is a diagram for explanation of an example of control aiming a tracking target to be positioned other than the center of an imaging range.

A specific example thereof will be described by use of FIG. 15. FIG. 15 illustrates an image captured by the imaging unit 20. For explanation, the horizontal direction in the image will be referred to as the x-direction, the vertical direction therein will be referred to as the y-direction, and the center coordinates of the image will be written as "(x, y)=(0, 0)".

A case is assumed where a tracking target in an image captured at a certain time point was captured at a position 54 displaced by x4 in the horizontal direction and by y4 in the vertical direction, from the center, (x, y)=(0, 0), of the image. In this case, the control device 10 or the control device 70 aims to capture an image such that the tracking target comes to a position 55 where the directions of displacement of the tracking target from the center of the image are the same and the displacement is smaller, instead of performing control aiming to capture an image such that the tracking target comes to the center of the image. If the position 55 is displaced from the center of the image by x5 in the horizontal direction and by y5 in the vertical direction, x5 and y5 are in ranges expressed by Equation 7 and Equation 8.

$$x5 = a \times x4 \quad (0 < a < 1) \quad (7)$$

$$y5 = b \times y4 \quad (0 < b < 1) \quad (8)$$

In these equations, "a" and "b" are preferably 0.2 to 0.3.

By controlling aiming to capture an image such that displacement of a tracking target from the center of the image is lessened instead of controlling aiming to capture an image such that the tracking target comes to the center of the image, the possibility of excessively moving the imaging direction is reduced and smoother tracking is enabled.

With respect to the first to third embodiments, a configuration where a tracking target is automatically tracked by movement of the imaging direction of an imaging unit has been described, but the present invention is not limited to the configuration where the imaging direction of the imaging unit is moved. The present invention is also applicable to an automatic tracking camera that tracks a tracking target by performing imaging with a wide imaging range beforehand, cutting out an image of the tracking target from a captured image, and enlarging the cut-out image.

The invention is not limited to above described embodiments, may be changed without departing from the scope of the present invention.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device for an automatic tracking camera that automatically tracks and images a tracking target, the control device comprising:
    a tracking target detecting unit configured to detect, based on information on the tracking target, the tracking target from an image captured by the automatic tracking camera;
    a storage unit configured to store registered data defining a relation between an influencing factor that influences a movement amount of the tracking target and an influence degree of the influencing factor;
    an influencing factor detecting unit configured to detect the influencing factor by image recognition of an image captured by the automatic tracking camera, and set the influence degree that corresponds to the influencing factor by reading the registered data from the storage unit; and
    an adjustment amount calculating unit configured to calculate an imaging direction adjustment amount for the automatic tracking camera based on the influence degree set by the influencing factor detecting unit and a past movement amount of the tracking target,
    wherein
    the adjustment amount calculating unit calculates the imaging direction adjustment amount to be a first value when the influencing factor is positioned in a moving direction of the tracking target, and
    the adjustment amount calculating unit calculates the imaging direction adjustment amount to be a second value that is larger than the first value when the influencing factor is positioned in a direction opposite to the moving direction of the tracking target.

2. The control device according to claim 1, wherein
    the storage unit stores, as the registered data, multiple influencing factors and respective influence degrees corresponding to the multiple influencing factors; and
    in response to detection, by the influencing factor detecting unit, of two or more influencing factors, the influencing factor detecting unit calculates a final influence degree based on a value calculated based on two or more of the influence degrees corresponding respectively to the two or more influencing factors.

3. The control device according to claim 1, wherein the adjustment amount calculating unit calculates an imaging direction adjustment amount Vx in a horizontal direction and an imaging direction adjustment amount Vy in a vertical direction of the automatic tracking camera using equations:

$$Vx = \alpha \times Mx + x1$$

$$Vy = \beta \times My + y1$$

where, x1 is a distance from a center of the image to the tracking target in the horizontal direction of the image captured by the automatic tracking camera, y1 is a distance from a center of the image to the tracking target in the vertical direction of the image captured by the automatic tracking camera, Mx is an imaging direction adjustment amount in the horizontal direction which is last calculated, My is an imaging direction adjustment amount in the vertical direction which is last calculated, $\alpha$ is an influence degree of the horizontal direction, and $\beta$ is an influence degree of the vertical direction.

4. The control device according to claim 1, wherein the influencing factor is a moving body, and the influence degree of the influencing factor is a value that differs depending on a positional relation between the tracking target and the influencing factor.

5. The control device according to claim 1, wherein
    in response to determining that the tracking target is displaced from a center of the image captured by the automatic tracking camera by a distance dx in a horizontal direction and a distance dy in a vertical direction, the adjustment amount calculating unit sets a target of adjustment of imaging direction for the automatic tracking camera to a position where the tracking target is displaced in same directions by a×dx in the horizontal direction and by b×dy in the vertical direction from the center of an image captured by the automatic tracking camera, and
    a and b are values larger than 0 and smaller than 1.

6. The control device according to claim 1, wherein the information on the influencing factor is an imaging direction of the automatic tracking camera.

7. The control device according to claim 1, further comprising:
    an artificial intelligence (AI) analyzing unit, which is the influencing factor detecting unit, configured to set the influence degree by using artificial intelligence based on two or more of the influencing factors, wherein
    the adjustment amount calculating unit calculates the imaging direction adjustment amount for the automatic tracking camera based on the influence degree set by the AI analyzing unit and the past movement amount of the tracking target.

8. The control device according to claim 7, wherein the AI analyzing unit calculates a correct answer for influence degree by analyzing the image captured by the automatic tracking camera by using the influence degree that has been set, and executes deep learning by using the correct answer for influence degree and the two or more of the influencing factors as teacher data.

9. The control device according to claim 7, wherein the two or more of the influencing factors comprise at least one of:
    an influencing factor that has been registered as an image;
    imaging direction of the automatic tracking camera;
    an elapsed time period from start of a game;
    a time;
    score information;
    temperature;
    humidity; or
    moving velocity of the tracking target.

10. A control method for an automatic tracking camera that automatically tracks and images a tracking target, the control method including:
    detecting, based on information on the tracking target, the tracking target from an image captured by the automatic tracking camera;
    storing registered information defining a relation between an influencing factor that influences a movement amount of the tracking target and an influence degree of the influencing factor in a storage unit;

detecting the influencing factor by image recognition of an image captured by the automatic tracking camera, and setting the influence degree that corresponds to the influencing factor by reading from the registered information stored in the storage unit; and calculating, based on the influence degree set by the setting of the influence degree and a past movement amount of the tracking target, an imaging direction adjustment amount for the automatic tracking camera, wherein the calculating comprises calculating the imaging direction adjustment amount to be a first value when the influencing factor is positioned in a moving direction of the tracking target, and calculating the imaging direction adjustment amount to be a second value larger than the first value when the influencing factor is positioned in a direction opposite to the moving direction of the tracking target.

11. The control device according to claim 1, wherein, the tracking target is a player of a basketball game, the influencing factor is an image of a hoop, the registered data defines influence degrees for a movement of the automatic tracking camera in a horizontal direction and a movement of the automatic tracking camera in a vertical direction, and the influencing factor detecting unit sets the influence degree in the vertical direction higher than the influence degree in the horizontal direction, in response to detecting the influencing factor in the image.

12. The control device according to claim 3, wherein the adjustment amount calculating unit sets $\alpha$ as 0.7 and sets $\beta$ as 1, when the influencing factor is positioned in a moving direction of the tracking target, and the adjustment amount calculating unit sets $\alpha$ as 1.3 and sets $\beta$ as 1, when the influencing factor is positioned in a direction opposite to the moving direction of the tracking target.

13. The control device according to claim 5, wherein, a and b are from 0.2 to 0.3.

* * * * *